Dec. 25, 1962 N. BLOEMBERGEN 3,070,698
QUANTUMMECHANICAL COUNTERS
Filed April 17, 1959
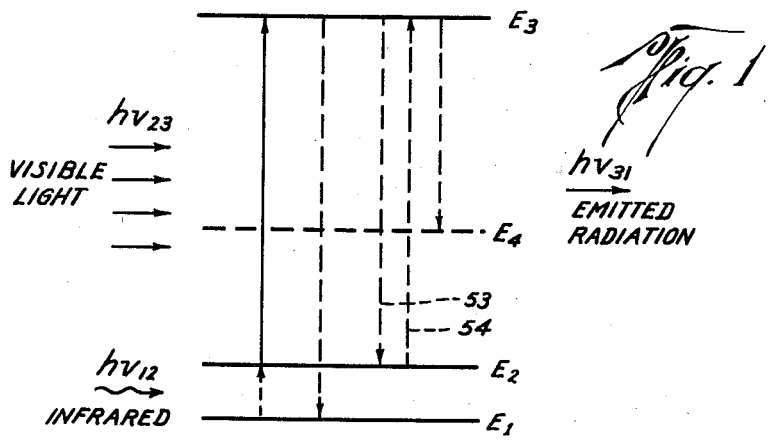
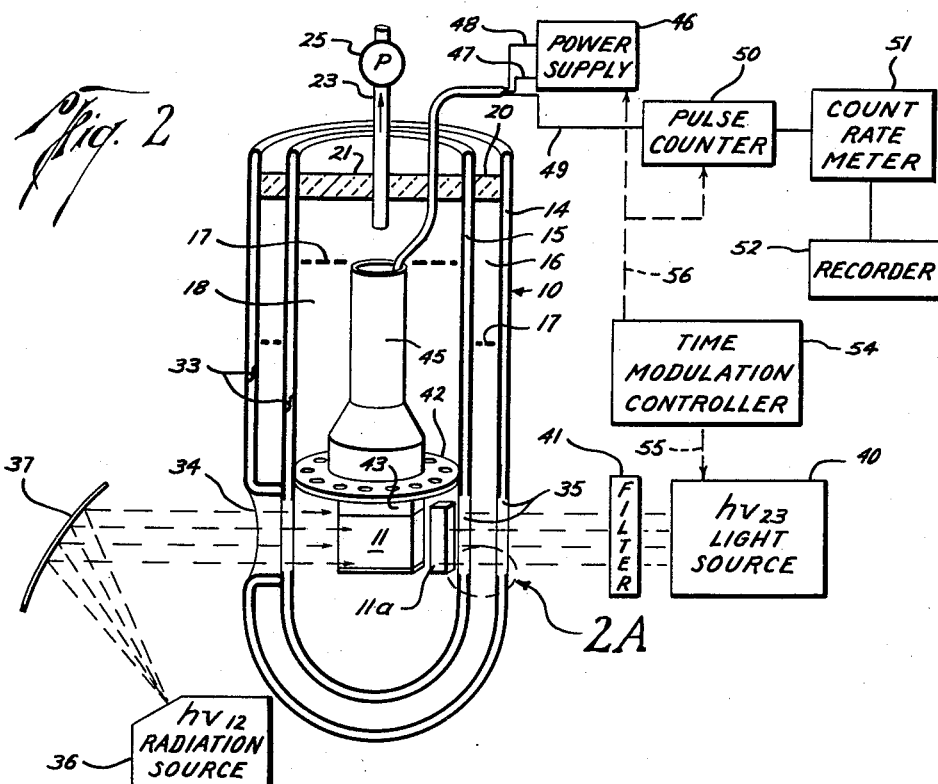
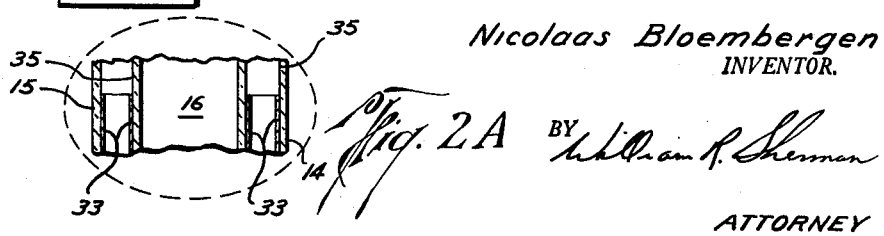
Nicolaas Bloembergen
INVENTOR.
BY William R. Sherman
ATTORNEY

United States Patent Office 3,070,698
Patented Dec. 25, 1962

3,070,698
QUANTUMMECHANICAL COUNTERS
Nicolaas Bloembergen, Lexington, Mass., assignor to Schlumberger Well Surveying Corporation, Houston, Tex., a corporation of Texas
Filed Apr. 17, 1959, Ser. No. 807,197
24 Claims. (Cl. 250—83.3)

This invention relates to radiation detecting systems and, more particularly, to systems for detecting electromagnetic quanta in the infrared or millimeter wave spectrum.

Infrared detectors have found expanding application in such fields as object location, signaling, vehicle guidance, and scientific instrumentation. Of increasing importance in many such applications is the attainable sensitivity. Substantial improvements have been made in the recent past in the development of lead and thallium sulfide cells and similar bolometers and in infrared sensitive photomultipliers. However, such devices fall far short of perfect efficiency of detection which would correspond with an indication of each infrared photon which reaches the detector.

Accordingly, it is an object of the present invention to provide improved radiation detecting systems which have an efficiency more nearly approaching a perfect response to each incident quantum.

Another object of this invention is to provide radiation detecting systems which are selectively responsive to quanta in a limited energy range.

A further object of the invention is to provide radiation detecting systems which may be operated continuously over a period of time without requiring renewal or replacement of a detecting element.

Yet another object of this invention is to provide radiation detecting systems wherein incident quanta having a frequency outside the visible spectrum are converted into visible quanta. Still another object of this invention is to provide radiation detecting systems which provide an output of quanta multiplied with respect to the number of incident quanta.

Another object of the invention is to provide radiation detecting systems which are responsive to infrared or millimeter wave quanta, yet are free of noise in the absence of such quanta for enhanced low-level resolution of incident radiation.

These and other objects are attained, in accordance with the invention, by providing a system having at least three unequally spaced, interrelated energy levels, only the lower level or ground state normally being populated. Transitions between two or more energy levels above the ground state are maintained in a condition of saturation by incidence of radiation, where saturation is defined as requiring radiation having sufficient intensity to ensure reasonable probability of a further transition to the upper of two energy levels when the other or intermediate level becomes occupied by an initial transition from the ground state. Such incident ratiation which is employed to pump the system to saturation has a frequency corresponding to the separation of the two energy levels. Upon incidence of a quantum of predetermined frequency, a transition from the ground state to the intermediate level occurs which, because of saturation of transitions between the intermediate and upper levels, results in a second transition to the upper level. Radiation is then emitted by decay from the upper energy level, and such radiation may be detected as an indication of the incidence of quanta which promoted the transition from the ground to the intermediate level. Typically, the decay radiation is of different frequency from that which is to be detected and that which is used to pump the system to saturation, so that selective detection is facilitated. The difference in the two frequencies may be enhanced by the presence of other intermediate levels. In a multi-level system having four or more levels, it is sometimes advantageous to use more than one pump frequency in order to differentiate even more markedly between the pump frequencies and the detected frequency.

In a preferred embodiment, a substance or material characterized by a multi-level energy system is placed in a cryostat and maintained at a temperature such that transitions from a ground state or first energy level to a second higher energy level are prohibited in the absence of absorbed energy greatly exceeding thermal energy in the substance. The second level is thus normally unpopulated. Intense radiation such as visible light is projected on the substance providing a relatively high or saturated probability of transitions from the second energy level to a third higher energy level. At the same time, the substance is exposed to incident quanta to be detected, such as infrared or millimeter wave quanta, capable of inducing transitions from the first to the second energy level. Upon occurrence of such a transition, a further transition to the third energy level is immediately obtained, followed by radiation emitted upon spontaneous decay from the third energy level. A photomultiplier which may be cryostated with the substance serves to selectively detect the decay radiation as an indication of incident infrared or millimeter wave quanta.

The invention, together with other of its objects and advantages, will be better understood from the following detailed description taken in conjunction with the accompanying drawing in which:

FIG. 1 is an energy level diagram for a typical substance which may be employed in the practice of the invention;

FIG. 2 is a schematic diagram of exemplary apparatus arranged in accordance with the invention, for its practice, and FIG. 2A is an enlarged view of a portion of the cryostat envelope illustrated in FIG. 2.

To obtain an understanding of the underlying details of radiation theory to which the present invention is related, reference may be taken to recent publications on the operation of so-called "masers" as well as to standard text on optics and quantummechanics. Among recent publications, those of more helpful significance include applicant's article entitled "Proposal for a New Type Solid State Maser" in the Physical Review, volume 104, October 15, 1956, and the article by J. Weber entitled "Maser Noise Considerations" in the Physical Review, volume 108, November 1, 1957. An understanding sufficient for purposes of comprehending the present invention may be gained, however, from a consideration of the relationships represented schematically in FIG. 1.

It is known that particles, whether free or bound in a solid matrix, exhibit atomic or molecular energy levels which are discreet and differ by values corresponding to the energy of photons or radiation quanta which are emitted or absorbed when a transition between energy levels occurs. While particles may under varying conditions such as under thermal excitation or in the presence of a magnetic field exhibit numerous different energy levels, in general at least three unequally spaced energy levels $E_1$, $E_2$, and $E_3$ may be selected which are interrelated by emission or absorption of quanta. By convention, energy level $E_3$ represents a higher energy state, $E_2$ an intermediate energy state and $E_1$ a low energy or ground state in the diagram of FIG. 1. Possible transitions are represented by arrows. The relationship of energy levels and emitted or absorbed radiation may be represented by the notation, $$hv_{12}=E_2-E_1$$
$$hv_{23}=E_3-E_2$$
$$hv_{31}=E_3-E_1$$

In these expressions, $h$ is Planck's constant and $v$ is the frequency of the electromagnetic radiation.

In a typical application of the present invention, the frequency $v_{12}$ may be that of infrared or millimeter wave quanta, $v_{23}$ may be a pumping frequency in the optical or ultraviolet spectrum and $v_{31}$ may be a second, higher frequency of decay radiation in the optical or ultraviolet spectrum.

In the absence of radiation $hv_{12}$ and $hv_{23}$, the population of particles having the three level system $E_1$, $E_2$, $E_3$ will be determined by transition probabilities under the influence of thermal energy. For example, the transition probability $w_{12}$ for transitions from the level $E_1$ to level $E_2$ under the influence of thermal motion of the lattice or structure containing the particles is an exponential function of $(-hv_{21}/kT)$, where $k$ is Boltzmann's constant and $T$ is temperature in degrees Kelvin. Thus, under steady state conditions, the population $n_1$ of the first energy level $E_1$ will exceed the population $n_2$ of energy level $E_2$ by an amount dependent upon the relation of $hv_{12}$ to $kT$. For purposes of the present invention, the energy level difference $hv_{12}$ must at least equal $10kT$ and preferably is much greater than $$kT(hv_{12}>>kT)$$

The significance of this requirement is that only the ground state $E_1$ is populated in the absence of radiation $hv_{12}$ so that transitions cannot occur from the empty level $E_2$ to the higher level $E_3$. Such a condition would of course actually only occur at absolute zero of temperature. However, in a practical system it is sufficient to have $v_{12}$ of such a magnitude that the above condition will hold. In the near infrared and optical frequencies where $v_{12}$ is very large the condition $(hv_{12}>>kT)$ will hold at even elevated temperatures so that for a quantum counter in this frequency range it might not be necessary to cryostat the detecting material.

Under the condition that the energy levels $E_2$ and $E_3$ are essentially unpopulated, radiation such as visible light having energy $hv_{23}$ may be projected on the detecting material without absorption even though of such intensity as to saturate the probability of transition from level $E_2$ to $E_3$, in accordance with the definition of saturation.

The fact that levels $E_2$ and $E_3$ are not populated is significant in that no energy is absorbed from the pump radiation by the system. In this respect, quantummechanical counters are significantly different from masers in which the pump radiation continually feeds energy into the system. In order to have maser amplification or oscillation, therefore, there must be a population in a level other than the ground state. In the present invention, only the ground state is populated and no energy is delivered by the pump until a signal is received.

In a practical realization of these conditions, the energy difference $hv_{12}$ may be made much greater than the thermal energy $kT$ by reducing the particle temperature to that of liquid helium, i.e., 4° K., or below. Saturation of transitions from level $E_2$ to level $E_3$, on the other hand, may be accomplished by projecting intense visible or ultraviolet light on the three level system. In accordance with the present invention, the intermediate energy level $E_2$ remains substantially unpopulated until quanta of frequency $v_{12}$ are incident upon the system, whereupon a double transition 1, 2 and 2, 3 is occasioned by virtue of the induced transition from level $E_2$ to level $E_3$. Thereafter, spontaneous emission occurs upon decay from level $E_3$ to a lower level, such as $E_2$ or $E_1$. It is to be observed, however, that such spontaneous emission is not produced in the absence of quanta $hv_{12}$ so that inherently noise free conversion of frequency $v_{12}$ to the frequency of the emitted radiation is obtained.

It is to be recognized, of course, that emission at frequency $v_{32}$ is difficult to detect in the presence of intense incident radiation at the same frequency $v_{23}$. Hence emission at frequency $v_{23}$ is typically utilized, in accordance with the present invention, to enhance the sensitivity to radiation $hv_{12}$ by a process which may be termed "resonance radiation." That is, under conditions of saturation, a particle which decays from the third level $E_3$ to the second level $E_2$ may be re-excited or re-pumped by the intense radiation $hv_{23}$ to the level $E_3$, with a further decay emission. In general, however, it is preferable that the decay mechanism for the particles under consideration favor a transition from level $E_3$ to a level other than $E_2$ whereby the resulting spontaneous emission may be observed or detected without the difficulty of discriminating against incident radiation having the same energy. Fortunately, three-level systems commonly exhibit decay transitions directly to the ground state $E_1$ and, in many instances, to a fourth level $E_4$ which results in a frequency of radiation even more readily distinguished from $v_{23}$. In either case, a substantially linear correspondence between incident radiation at frequency $v_{12}$ and the emitted radiation may be obtained, free of spontaneous emission noise.

Exemplary apparatus for deriving these advantages of highly sensitive, substantially noise-free detection of radiation in accordance with the invention is illustrated schematically in FIG. 2 wherein the multi-level system is contained in a cryostat 10. The multi-level system is obtained in detecting crystal 11 (as well as filter crystal 11a) containing ions which, among others, have the energy levels $E_1$, $E_2$ and $E_3$ shown in FIG. 1. While a wide variety of substances are suitable for this application, depending upon the energy level differences to be employed, the energy level scheme illustrated in the figure are most typically obtained with rare earth metallic ions and other transition group ions in various oxides and salts. Such ions typically exhibit three or more unequally spaced energy levels adapted to the practice of the invention. The crystal 11 may then be a salt of such ion although in many instances embedding such ions as impurities in a host lattice is preferable, as the numbers of ions per unit volume may then be selected to obtain an optimum between sensitivity to incident radiation $hv_{12}$ and self-absorption of the radiation $hv_{23}$ emitted by spontaneous transitions. Such level schemes may also be obtained in various systems of free radicals and in fluorescent glasses and plastics such as fluorescein in Plexiglas.

Whatever the mechanism responsible for the origin of the energy levels, cryostating of the system is usually desirable to bring the total population N to the ground state $E_1$. To this end, the cryostat 10 may have any suitable construction, a variety of forms being commercially available. For purposes of illustration, however, the cryostat might comprise a double Dewar envelope 14, 15 providing an intermediate space 16 which may be filled with liquid helium 17 or liquid air. The detecting crystal 11 and filter 11a are contained in a separate, central chamber 18 and likewise this chamber contains liquid helium 17. End closures 20, 21 may be used to seal off and position the Dewar systems and to afford a space above the liquid helium in the sample chamber 18. The temperature of the liquid helium may then be adjusted by varying or lowering the vapor pressure above the liquid helium bath, as by pumping via tubulation 23 with the vacuum pump 25 in communication with the sample chamber. In a typical case, the pumping rate on the liquid helium bath would be adjusted to produce a temperature between 1 and 4° K. in the sample chamber.

While the double glass walls of the Dewar envelopes 14, 15 are typically provided throughout with a silver or reflective coating 33, such coatings are omitted or removed in two areas opposite transverse faces of the crystal 11 to provide windows 34 and 35 for transmission of radiation. Radiation from a source 36 of infrared or millimeter wave quanta is conveniently projected through window 34 onto one face of crystal 11 by a concave mirror 37 mounted in relation to crystal 11 by means not illustrated. Depending upon whether source 12 is fixed, movable or of a type to be scanned, the mounting of mirror 37 may be fixed or movable, large or small in relation to the crystal and cryostat. For example, if the apparatus is applied to detection of missiles in flight, the mirror 37 and associated apparatus desirably is mounted for tracking movement so as to maintain the image of the object tracked focussed upon the crystal 11.

Window 34 may be composed of glass but a special material is preferably employed having a low absorption coefficient at the frequency of the particular radiation to be transmitted and a high coefficient for other frequencies.

To excite transitions from intermediate level $E_2$ to upper level $E_3$, an intense flux of radiation including components of frequency $\nu_{23}$ is derived from source 40 via filter 41 and wnidow 35. The power necessary to produce the saturation condition between levels $E_2$ and $E_3$ is determined by the so-called relaxation time $T_1$ between the levels. The relaxation time $T_1$ is defined in a manner well recognized in the art as the time required for the population in state $E_2$ to come to thermal equilibrium with all the states in the lattice or crystal in the absence of any externally applied radiation field. In choosing a material to be used in the detecting crystal of a quantummechanical counter, therefore, it would always be preferable to choose one which had a long relaxation time relating the pumper level $E_2$ to all other levels and particularly to the ground state $E_1$.

In order that the radiation projected through window 35 may not include frequencies in the vicinity of $\nu_{12}$ (the frequency of the radiation to be detected), or interfere with detection of the spontaneous emission radiation resulting from decay from level $E_3$, or from another level, source 40 together with filter 41 are desirably arranged to project upon detecting crystal 11 an individual spectroscopic line of frequency $\nu_{23}$. Alternatively, the ion which is active in the crystal 11 may be employed as the active element of the light source 40 to produce radiation by electrical discharge at the characteristic frequency $\nu_{23}$, the filter 41 being employed to eliminate undesirable frequency components. In a typical system, the filter 41 may be a narrow band optical filter which is commercially available. In another embodiment, filter 41 may be an absorptive crystal including an element identical to the active ion. To prevent production of any transitions from the ground state to an upper state by the pump radiation or components of extraneous radiation, it is always desirable to have the pump radiation transmitted to the detecting crystal through the identical crystal 11a situated between windows 35 and the detecting crystal 11. Because of the high ground state population, this filtering crystal 11a is opaque to any radiation connecting the ground state to an upper energy level. Whatever method is used then to filter the radiation $h\nu_{23}$ projected through window 35 upon the face of detecting crystal 11, it is preferable that this radiation be of sufficient intensity to excite to saturation the transitions $E_2$, $E_3$.

Supported, as by perforated annular spacer 42, in optically coupled relation to the top face of crystal 11 is a filter 43 which may be employed, if necessary, to prevent transmission of radiation resulting other than by spontaneous emission from level $E_3$ to, say, level $E_4$. Optically coupled in turn to the upper face of filter 43 is the semi-transparent cathode of a photomultiplier tube 45. While such photomultiplier tube may be of any commercially available design suitably employed in this application, a linear arrangement of dynodes such as in the photomultiplier described in Lallemand Patent No. 2,866,914 is well adapted to the space limitations of the Dewar envelope and has a very low noise figure.

The necessary voltage for operation of the photomultiplier may be furnished by power supply 46 via conductors 47, 48 while output signals from the photomultiplier are supplied via conductor 49 to a pulse counter 50 or other suitable output device. Although various output presentations may provide indications of decay emission from the excited state $E_3$, useful information generally is obtained by coupling the output of pulse counter 50 to a count rate meter 51 which in turn is coupled to a recorder 52.

In an exemplary operation of the apparatus in FIG. 2, the crystal 11, photomultiplier 45 and associated elements are installed in the chamber 18 of the cryostat 10. The temperature of the crystal 11 is depressed by transfer of heat to the surrounding liquid helium, the vacuum pump 25 being operated to withdraw gaseous helium as it is boiled off into the space above the liquid helium, thereby to maintain a temperature in the vicinity of 4° K. or lower by continued helium evaporation in the manner described above. In any event, the temperature of the crystal 11 is reduced so that, to a good approximation, only the ground state $E_1$ is populated.

The light source 40 is then energized to project optical or ultraviolet light of frequency $\nu_{23}$ through window 35, through crystal 11a, on and into crystal 11. The intensity of the incident light $h\nu_{23}$ is adjusted desirably to a value which saturates transitions from level $E_2$ to level $E_3$. Since, at this point, level $E_2$ is not populated, no particles are excited to the higher level $E_3$, no spontaneous emission results, and consequently the absorption of the incident light $h\nu_{23}$ in crystal 11 is relatively negligible. By the same token, no scintillation or decay radiations are transmitted from the crystal to the photomultiplier 45. Because the photomultiplier, which is likewise cryostated, is free of spontaneous emission noise or "dark current," the absence of radiation $h\nu_{12}$ may clearly be indicated by counter 50, meter 51 and recorder 52, free of any background noise signal.

When the crystal 11 is now exposed to radiation $h\nu_{12}$, ions therein are excited from the ground state $E_1$ to the energy level $E_2$. In general, these transitions are induced in proportion to the intensity of radiation such as infrared or millimeter wave quanta incident from source 36. Because the ground state is heavily populated and the frequency $\nu_{12}$ has been chosen as the separation between levels $E_1$ and $E_2$, the crystal is completely opaque at frequency $\nu_{12}$ and all incident quanta are absorbed.

Whenever a particle is excited to energy level $E_2$, the saturating flux of frequency $\nu_{23}$ from source 40 makes highly probable a second transition to the excited level $E_3$. Emission of a photon by the excited ion then occurs, the emission probability being characterized by the oscillator strength in a manner well recognized in the art. The radiation resulting from this spontaneous emission strikes the photocathode of photomultiplier tube 45 to release a photoelectron into its dynode structure, and a count is obtained. In a typical application, of course, numbers of quanta $h\nu_{12}$ incident upon the crystal 11 induce corresponding transitions to the level $E_2$, with second transitions to excited level $E_3$ and spontaneous emission, all in accordance with the probabilities for such transitions and taking account of such mechanisms as self-absorption of emitted quanta, resonance radiation (indicated by lines 53, 53' of FIG. 1) and scattering. Because the detection of incident radiation $h\nu_{12}$ is essentially noise-free, however, the threshold of sensitivity to radiation of frequency $\nu_{12}$ is extremely low, much lower than is achievable by the photoelectric and black-body radiation detectors or bolometers heretofore employed.

It may be noted that source 36 and particularly source 40 are arranged to project radiation into crystal 11 at right angles to the line of optical coupling between the crystal and photomultiplier 45. In consequence, the photomultiplier 45 is not exposed to direct radiation from the source. To the extent that the photomultiplier is sensitive to radiation from these sources, only that fraction of the incident radiation which is scattered in the direction of the photocathode need be filtered in frequency and/or polarization to prevent false counts. Desirably, of course, the photocathode has a composition selectively sensitive to radiation of the spontaneous emission frequency.

In a modification of the invention, a modulation technique may be used to prevent the pump radiation from exciting the photomultiplier 45. In normal circumstances, when the particle is excited to state $E_3$ it does not immediately drop to $E_1$ but stays in $E_3$ for some time determined by the spontaneous transition probability. It is therefore possible to modulate the pump radiation on and off with a period shorter than the probable spontaneous transition time. During the time the pump radiation is on, the photomultiplier 45 is biased so that it is insensitive to any radiation. When the pump power is turned off, the bias on the photomultiplier is removed and spontaneous radiation from $E_3$ to $E_1$ could be detected in the absence of the pump radiation. The signal-to-noise ratio achieved with such a system may be further enhanced by detecting the signal from the photomultiplier in phase with the modulation frequency to obtain a narrow band output. For example, a time modulation controller 54 may be provided having connection 55 of one phase with light source 40 and connections 56 of opposite phase with power supply 46 and pulse counter 50. During first alternate intervals, the signal supplied by controller 54 energizes source 40, biases off photomultiplier 45, clears counter 50. During second alternate intervals, controller 54 deenergizes light source 40, and restores photomultiplier 45 and counter 50 to operation. Of course, a variety of control arrangements may be employed for this purpose.

To exemplify radiation frequencies applicable to at least one useful application of the apparatus, the crystal 11 may be continuously radiated with visible light at about $2.4 \times 10^4$ cm.$^{-1}$ (4,000 A.). Rare-earth metals which provide a three-level system susceptible to saturation of the optical absorption coefficient at the pumping wave length (4,000 A.) are for example, such paramagnetic rare-earth metals as praseodymium, europium, gadolinium and dysprosium. A shorter wave length radiation results from spontaneous emission of quanta $h\nu_{31}$. Other ions typically require wave lengths differing from 4,000 A. although otherwise functioning in essentially the same manner as these particular metals.

Systems incorporating more than three levels may, of course, be employed including those which utilize optical pumping for double transitions, that is, optical pumping which induces transitions to an intermediate level (such as $E_4$) and then to a higher level (such as $E_3$) from which spontaneous emission to obtained. Correspondingly, spontaneous emission of more than one frequency may be obtained, such as the frequencies $\nu_{34}$ and $\nu_{31}$, depending upon the decay mechanism of the excited particle. If one such frequency is subject to self-absorption in the crystal, the photomultiplier may be arranged for selective detection of the remaining frequency or frequencies. In selecting the substance which defines the levels of the system, consideration is given not only to the level differences which determine the frequencies of the detected quanta, the pumping flux and the spontaneous emission but also the efficiency obtained in converting the detected quanta $h\nu_{12}$ into spontaneously emitted quanta of different frequency capable of escaping the crystal. Practical consideration is also given to the efficiency of the monochrometer or filtered source 40 and the filtering and sensitivity characteristics at the photomultiplier.

The difficulties involved in finding sharp filters to differentiate between the pump frequency and the converted frequency may be avoided by using a salt which has more than three levels and by pumping between more than one pair of levels. For example, in a four level system, using a detection frequency of $\nu_{12}$, two pumped frequencies $\nu_{23}$ and $\nu_{34}$ and the spontaneous emission frequency $\nu_{14}$, one might obtain a situation where $\nu_{12}$ lies in the infrared band, $\nu_{23}$ and $\nu_{34}$ are in the optical frequency band while $\nu_{14}$ is in the ultraviolet. The detected, the pump, and the emitted frequencies would then be in different regions of the electromagnetic spectrum and could be easily filtered.

In lieu of employing a crystal or ion impurities in a lattice, advantage may be taken of the properties of a photosensitive semiconductor in practicing the invention. In this instance, $E_1$ is an occupied deep impurity level, $E_2$ is an empty impurity level, and $E_3$ represents the conduction band. By exposing the semiconductor to incident quanta $h\nu_{12}$ a photoconductive avalanche is triggered in the semiconductor which may be suitably detected. It is alternatively possible to use free atoms in a beam effectively at absolute zero of temperature but, in general, a three-level system of this type is relatively inefficient in a practical application.

The invention, both as to apparatus and its practice is susceptible to various other modifications, many of which will occur to those skilled in the art. For example, the photomultiplier 45 may be located outside the cryostat and have optical coupling with the crystal through a suitable window. The filter 43 which limits this optical coupling to radiation at the spontaneous emission frequency may, if desired, have the form of a frequency selective polaroid "sandwich" comprising a linear polaroid film establishing a first plane of polarization, a film having a quarter-wave length thickness for the frequency to be transmitted and serving to rotate the plane of polarization through 45° to such a frequency component, and a second polaroid film aligned to transmit such radiation at the 45° rotationally polarized angle. A similar polaroid sandwich may be utilized for filter 41. Correlating the orientation of filters 41, 43, where both are of this polaroid type may lead to preferential transmission of spontaneous emission quanta, depending upon the scattering properties of substance 11. Polaroid sandwiches of this type are available commercially from the Polaroid Corporation.

In lieu of detection of emitted radiation by a photomultiplier, visual, photographic or other techniques may be employed.

Accordingly, the invention is not limited to the embodiment which is illustrated and described but is of a scope defined in the appended claims.

I claim:

1. In a method of converting radiation of one quantum energy into radiation of another quantum energy, the steps of reducing the temperature of a multiple energy level system to inhibit thermal transitions from a first energy level to a second higher energy level, exposing said system to radiation having a first quantum energy capable of simulating transitions from said first energy level to said second energy level at said reduced temperature, and exposing said system to radiation having a second quantum energy capable of stimulating transitions from said second energy level to a third higher energy level, whereby radiation is emitted spontaneously by decay from said third energy level.

2. In a method of converting radiation of one quantum energy into radiation of another quantum energy, the steps of reducing the temperature of a multiple energy level system near to absolute zero to inhibit thermal transitions from a first energy level to a second higher energy level, exposing said system to radiation having a first quantum energy capable of stimulating transitions from said first energy level to said second energy level at said reduced temperature, and exposing said system to radiation having a second quantum energy capable of stimulating transitions from said second energy level to a third higher energy level, whereby radiation is emitted spontaneously upon decay from said third energy level.

3. In a method of converting radiation of one quantum energy into radiation of another quantum energy, the steps of exposing a multiple energy level system to radiation having a first quantum energy capable of stimulating transitions from a first energy level to a second higher energy level, and exposing said system to radiation having a second quantum energy capable of stimulating transitions from said second energy level to a third higher energy level and having an intensity substantially to saturate the probability of such transitions, whereby radiation is emitted spontaneously by decay from said third energy level in response to radiation having said first quantum energy.

4. In a method of converting radiation of one quantum energy into radiation of another quantum energy, the steps of reducing the temperature of a multiple energy level system substantially to absolute zero to inhibit thermal transitions from a first energy level to a second higher energy level, exposing said system to radiation having a first quantum energy capable of stimulating transitions from said first energy level to said second energy level at said reduced temperature, and exposing said system to radiation having a second quantum energy capable of stimulating transitions from said second energy level to a third higher energy level from which spontaneous emission having a third quantum energy is obtained, the radiation of said second quantum energy having an intensity substantially to saturate the probability of transitions from said second to said third energy level.

5. In a method for deriving radiation from a system having at least three unequally spaced interrelated energy levels, the steps of depressing substantially to zero the transition probability from a first to a second of said energy levels under the influence of thermal motion, and stimulating transitions from said second energy level to a third of said energy levels at a rate greater than the rate of decay from said second to said first energy level to obtain emitted radiation by decay from said third energy level when a transition from said first to said second energy level is induced.

6. In a method for deriving radiation from particles of a solid exhibiting at least three unequally spaced interrelated energy levels, the steps of cryostating said solid to depress substantially to zero the transition probability from a first to a second of said energy levels under the influence of thermal motion, and stimulating transitions from said second energy level to a third of said energy levels at a rate greater than the rate of decay from said second to said first energy level by projecting intense radiation on said solid to obtain emitted radiation by decay from said third energy level when a transition from said first to said second energy level is induced.

7. In a method for deriving radiation from particles of a solid exhibiting at least three unequally spaced interconnected energy levels, the steps of cryostating said solid to depress substantially to zero the transition probability from a first to a second of said energy levels under the influence of thermal motion, stimulating transitions from said second energy level to a third of said energy levels to obtain emitted radiation by decay from said third energy level when a transition from said first to said second energy level is induced, and selectively detecting radiation emitted by said solid having a quantum energy different from the energy difference between said first and second levels and said second and third levels.

8. In a method for detecting radiation having a quantum energy capable of stimulating transitions from the ground state to an intermediate level of a multiple energy level system, the steps of substantially saturating the transition probability from the intermediate level to a higher energy level of said system while maintaining the temperature of said system low enough that the intermediate level remains substantially unpopulated in the absence of radiation having said quantum energy, and selectively detecting radiation emitted spontaneously by said system.

9. In a method for detecting radiation having a quantum energy capable of stimulating transitions from the ground state to an intermediate level of a multiple energy level system exhibited by a solid, the steps of substantially saturating the transition probability from the intermediate level to a higher energy level of said system while maintaining the temperature of said solid so proximate to absolute zero that the intermediate level remains substantially unpopulated in the absence of radiation having said quantum energy, and detecting radiation emitted spontaneously by said solid in response to decay transitions from said higher energy level.

10. In a method for detecting radiation having a quantum energy capable of stimulating transitions from the ground state to an intermediate level of a multiple energy level system exhibited by a solid, the steps of maintaining said solid at liquid helium temperature, projecting intense optical radiation upon said solid substantially to saturate the transition probability from the intermediate level to a higher energy level of said system while said intermediate level remains substantially unpopulated in the absence of radiation having said quantum energy, and selectively detecting radiation emitted by said solid when a transition for said higher energy level to a lower energy lever occurs.

11. In a method for detecting infrared radiation capable of stimulating transitions from the ground state to an intermediate level of a multiple energy level system exhibited by a solid, the steps of maintaining said solid at a temperature near absolute zero, saturating the transition probability from the intermediate level to a higher energy level of said system while said intermediate level remains substantially unpopulated in the absence of said infrared radiation, and selectively detecting fluorescent quanta emitted by said solid when a transition from said higher energy to an energy level lower than said intermediate energy level occurs.

12. In a method for detecting infrared radition, the steps of maintaining the temperature of a solid substance exhibiting at least three unequally spaced energy levels sufficiently near absolute zero that only the ground state is populated in the absence of infrared radiation, projecting intense optical radition comprising essentially monochromatic visible light upon said substance substantially to saturate the probability of transitions from an intermediate level to which said substance is excited in the presence of infrared radiation to a higher energy level, and selectively detecting radiation spontaneously emitted by said system at a frequency different from said infrared and optical radiation when a transition from said higher energy level to an energy level lower than said intermediate energy level occurs.

13. A quantum converter comprising a substance having quantum-mechanical states providing at least three unequally spaced energy levels, means for depressing the effective temperature of said substance to inhibit thermally-induced transitions from a first energy level to a second higher energy level, and means for inducing transitions from said second energy level to a third higher energy level to produce photon emission by decay from said third energy level when a transition is induced from the first to the second energy level.

14. A quantum converter comprising a substance having quantum-mechanical states providing at least three unequally spaced energy levels, means for depressing the effective temperature of said substance to inhibit thermally-induced transitions from a first energy level to a second higher energy level thereby to maintain said second energy level normally unpopuated, and means for stimulating transitions from said second energy level to a third higher energy level to produce quantum emission by decay from said third energy level when a transition is induced from the first to the second energy level.

15. A quantum converter comprising a substance having quantum-mechanical states providing at least three unequally spaced energy levels, a cryostat to maintain said substance at a temperature sufficiently low to inhibit thermally-induced transitions from a first energy level to a second higher energy level while exposing said substance to quantum energy tending to induce transitions from said first to said second energy level, and means for exposing said substance to radiation which has an energy and intensity to stimulate transitions from the second energy level to a third higher energy level to obtain quantum emission from said substance by decay from said third energy level when a transition is induced from the first to the second energy level.

16. A quantum converter comprising a cryostat, a substance received in said cryostat and having quantum-mechanical states providing at least three unequally spaced energy levels, only the ground state being populated at a temperature maintained by said cryostat in the absence of radiation in the infrared or millimeter wave spectrum, and means for projecting radiation upon said substance having a quantum energy and intensity substantially to saturate the probability of transitions from the normally unpopulated second energy level to a third higher energy level to obtain quantum emission by decay from said third energy level when a transition is induced from the first to the second energy level by radiation in said range.

17. A radiation detector comprising a substance having quantum-mechanical states providing at least three unequally spaced energy levels, only the lowest of which is populated under cryogenic conditions, said substance being excitable to a second energy level upon absorption of infrared of millimeter wave quanta, means for inducing transitions from said second energy level to a third higher energy level with a high probability to produce quantum emission by decay from said third energy level when a transition is induced from said lowest to said second energy level, and photosensitive means for detecting said quantum emission.

18. A radiation detector comprising a substance having quantum-mechanical states providing at least three unequally spaced energy levels, only the lowest of which is populated under cryogenic conditions, said substance being excitable to a normally unpopulated second energy level upon absorption of quanta of the frequency to be detected, said substance including a detecting portion exposed to said quanta and a filtering portion optically coupled to said detecting portion, means for projecting radiation through said filtering portion onto said detecting portion having a quantum energy and intensity substantially to saturate the probability of transitions from the second energy level to a third higher energy level to obtain quantum emission by decay from said third energy level when a transition is induced from the first to the second energy level, and photosensitive means selectively coupled with said detecting portion for detecting said decay emission.

19. A detector for infrared or millimeter wave quanta comprising a cryostat, a substance contained within said cryostat providing at least three unequally spaced energy levels, only the lowest of which is populated under cryogenic conditions, said cryostat having a window for exposing said substance to quanta to be detected whereby said substance is excited to a second energy level upon absorption of said quanta, means for projecting effectively monochromatic radiation upon said substance to saturate the probability of transitions from said second energy level to a third higher energy level to produce quantum emission by decay from said third energy level when a transition is induced from the first to the second energy level, a photomultiplier in said cryostat optically coupled to said substance for response to said quantum emission, and means exterior to said cryostat coupled with said photomultiplier for providing indications of absorption by said substance of infrared or millimeter wave quanta.

20. A quantum detector as defined in claim 19, including a filter optically interposed between said substance and said photomultiplier, and wherein said projecting means includes a light source and a filter, said filters serving to limit response of said photomultiplier to quantum emission produced by decay from said third energy level.

21. Apparatus for detecting radiation having a quantum energy capable of stimulating transitions from the ground state to an intermediate level of a multiple energy level system, comprising a solid substance characterized by said multiple energy level system, means for substantially saturating the transition probability from the intermediate level to a higher energy level of said system during first time intervals shorter than the relaxation time relating such energy levels, means for simultaneously maintaining the temperature of said solid substance low enough that the intermediate level of said system remains substantially unpopulated in the absence of radiation having said quantum energy, and means for selectively detecting radiation emitted spontaneously by said solid substance during second time intervals alternate with said first intervals.

22. A quantum converter as defined in claim 13 wherein said substance comprises a photosensitive semiconductor having an occupied deep impurity level corresponding to said first energy level, an empty impurity level corresponding to said second energy level, and a conduction band including said third energy level.

23. A quantum converter as defined in claim 13 wherein said substance includes ions contained in a rigid lattice and exhibiting said energy levels as a result of electron-lattice coupling.

24. A quantum converter as defined in claim 23 wherein said ions are of a paramagnetic rare-earth metal.

References Cited in the file of this patent

UNITED STATES PATENTS

| | | |
|---|---|---|
| 2,671,154 | Burstein | Mar. 2, 1954 |
| 2,692,950 | Wallace | Oct. 26, 1954 |
| 2,705,758 | Kaprelian | Apr. 5, 1955 |
| 2,706,790 | Jacobs | Apr. 19, 1955 |
| 2,788,452 | Steruglass | Apr. 9, 1957 |
| 2,879,424 | Garburg et al. | Mar. 24, 1959 |

OTHER REFERENCES

Attenuated Semiconductors, by Andrews et al., Review of Scientific Instruments, vol. 13, July 1942, pages 281 to 292.